(12) United States Patent
Chalfant, III et al.

(10) Patent No.: US 9,800,332 B2
(45) Date of Patent: Oct. 24, 2017

(54) ACQUISITION, TRACKING, AND POINTING APPARATUS FOR FREE SPACE OPTICAL COMMUNICATIONS WITH MOVING FOCAL PLANE ARRAY

(71) Applicants: Charles H. Chalfant, III, Fayetteville, AR (US); Terry Tidwell, West Fork, AR (US); Michael Leary, Farmington, AR (US); Liam Borsodi, Fayetteville, AR (US)

(72) Inventors: Charles H. Chalfant, III, Fayetteville, AR (US); Terry Tidwell, West Fork, AR (US); Michael Leary, Farmington, AR (US); Liam Borsodi, Fayetteville, AR (US)

(73) Assignee: Space Photonics, Inc., Fayetteville, AR (US)

( * ) Notice: Subject to any disclaimer, the term of this patent is extended or adjusted under 35 U.S.C. 154(b) by 0 days.

(21) Appl. No.: 14/584,134

(22) Filed: Dec. 29, 2014

(65) Prior Publication Data

US 2015/0188628 A1    Jul. 2, 2015

Related U.S. Application Data

(60) Provisional application No. 61/921,331, filed on Dec. 27, 2013.

(51) Int. Cl.
*H04B 10/00* (2013.01)
*H04B 10/112* (2013.01)
*G02B 13/22* (2006.01)
*G02B 23/00* (2006.01)

(52) U.S. Cl.
CPC .......... *H04B 10/112* (2013.01); *G02B 13/22* (2013.01); *G02B 23/00* (2013.01)

(58) Field of Classification Search
USPC ................................................. 398/118–131
See application file for complete search history.

(56) References Cited

U.S. PATENT DOCUMENTS

| | | | | |
|---|---|---|---|---|
| 4,939,369 A | * | 7/1990 | Elabd | G01S 7/486 250/330 |
| 5,142,399 A | * | 8/1992 | Bertrand | H04B 10/1143 398/118 |
| 5,142,400 A | * | 8/1992 | Solinsky | H04B 10/1127 356/139.05 |
| 5,347,387 A | * | 9/1994 | Rice | H04B 10/1125 250/203.2 |
| 5,517,016 A | * | 5/1996 | Lesh | H04B 10/118 250/201.1 |

(Continued)

*Primary Examiner* — Agustin Bello

(57) ABSTRACT

An acquisition, pointing, and tracking (ATP) apparatus for free space optical (FSO) communications systems incorporates a multi-element detector array positioned at a focal plane of an optical telescope. An optical communications element lies at the center of the detector array. In lieu of traditional beam steering, the apparatus performs pointing and tracking functions internally by first calculating a position of an optical maximum on the detector array, and then translating the detector array within the focal plane of the telescope such that the optical communications element lies at the optical maximum for transmitting and/or receiving optical communications signals.

17 Claims, 5 Drawing Sheets

(56) References Cited

U.S. PATENT DOCUMENTS

| | | | | |
|---|---|---|---|---|
| 5,790,291 A * | 8/1998 | Britz | | H04B 10/11 250/206.1 |
| 5,953,146 A * | 9/1999 | Shelby | | H04B 10/11 398/131 |
| 6,002,818 A * | 12/1999 | Fatehi | | H04Q 11/0005 385/16 |
| 6,154,297 A * | 11/2000 | Javitt | | H04B 10/11 398/1 |
| 6,178,024 B1 * | 1/2001 | Degura | | H04B 10/1125 398/119 |
| 6,297,897 B1 * | 10/2001 | Czichy | | H04B 10/118 398/122 |
| 6,493,490 B1 * | 12/2002 | Steiger | | G02B 6/422 356/400 |
| 6,522,437 B2 * | 2/2003 | Presley | | H04B 10/1125 398/128 |
| 6,535,314 B1 * | 3/2003 | Mendenhall | | H04B 10/118 250/491.1 |
| 6,721,510 B2 * | 4/2004 | Graves | | H04B 10/1125 398/122 |
| 6,865,347 B2 * | 3/2005 | Perkins | | G01S 1/70 398/130 |
| 6,868,237 B2 * | 3/2005 | Willebrand | | H04B 10/1125 359/341.1 |
| 6,935,042 B2 * | 8/2005 | Bonham | | G02B 6/32 33/645 |
| 7,079,774 B2 * | 7/2006 | Sidorovich | | H04B 10/1149 398/129 |
| 7,142,348 B2 * | 11/2006 | Sayyah | | G01S 17/74 250/214 R |
| 7,187,815 B1 * | 3/2007 | Sweatt | | G02B 3/0012 250/201.9 |
| 7,224,508 B2 * | 5/2007 | Chalfant, III | | 359/290 |
| 7,292,788 B2 * | 11/2007 | Triebes | | H04B 10/1125 398/121 |
| 7,292,789 B1 * | 11/2007 | Capots | | H04B 10/1121 398/121 |
| 7,343,099 B2 * | 3/2008 | Wirth | | G02B 26/06 398/123 |
| 7,403,719 B2 | 7/2008 | Koontz | | |
| 7,457,545 B2 * | 11/2008 | Wirth | | H04B 10/1125 250/201.9 |
| 7,561,802 B2 * | 7/2009 | Krill | | H04B 10/118 398/121 |
| 7,577,364 B2 * | 8/2009 | Edwards | | H04B 10/1149 257/444 |
| 7,609,972 B2 * | 10/2009 | Cunningham | | H04B 10/1127 398/118 |
| 7,612,317 B2 * | 11/2009 | Chalfant, III | | G01S 7/4817 250/203.1 |
| 7,612,329 B2 * | 11/2009 | Chalfant, III | | 250/234 |
| 7,616,897 B2 * | 11/2009 | Graves | | H04B 10/1121 398/119 |
| 7,643,755 B2 * | 1/2010 | Rafferty | | H04B 10/118 398/118 |
| 7,796,885 B2 * | 9/2010 | Dress | | H04B 10/803 398/118 |
| 7,809,278 B2 * | 10/2010 | Morris | | H04B 10/1143 398/129 |
| 7,978,981 B2 * | 7/2011 | Buckman | | H04B 10/801 398/118 |
| 8,009,991 B2 | 8/2011 | Morris et al. | | |
| 8,160,452 B1 * | 4/2012 | Tidwell | | 398/138 |
| 8,233,806 B2 * | 7/2012 | Kitaji | | H04B 10/1149 398/118 |
| 8,294,100 B2 * | 10/2012 | Rafferty | | H01L 27/14625 250/332 |
| 8,301,032 B2 * | 10/2012 | Majumdar | | H04B 10/1123 398/129 |
| 8,311,414 B2 * | 11/2012 | Niiho | | H04B 10/1121 398/129 |
| 8,588,617 B2 * | 11/2013 | Vaillon | | H04B 10/118 398/122 |
| 8,995,841 B1 * | 3/2015 | Chalfant, III | | H04B 10/1125 398/119 |
| 9,042,734 B2 * | 5/2015 | Makowski | | H04B 10/11 398/118 |
| 2002/0109884 A1 * | 8/2002 | Presley | | H04B 10/1125 398/121 |
| 2002/0131121 A1 * | 9/2002 | Jeganathan | | H04B 10/1127 398/128 |
| 2002/0196506 A1 * | 12/2002 | Graves | | H04B 10/1125 398/126 |
| 2003/0001073 A1 * | 1/2003 | Presby | | H04B 10/1121 250/201.9 |
| 2003/0067657 A1 * | 4/2003 | Dimmler | | H04B 10/112 398/129 |
| 2003/0213915 A1 * | 11/2003 | Chao | | H01L 27/14643 250/370.14 |
| 2004/0052465 A1 * | 3/2004 | Verbana | | H04B 10/1141 385/49 |
| 2004/0156640 A1 * | 8/2004 | Dress | | G06E 3/006 398/140 |
| 2005/0191062 A1 * | 9/2005 | Rafferty | | H04B 10/118 398/202 |
| 2005/0253055 A1 * | 11/2005 | Sprague | | G02B 26/085 250/234 |
| 2006/0182448 A1 * | 8/2006 | Chalfant, III | | H04B 10/40 398/131 |
| 2007/0031151 A1 * | 2/2007 | Cunningham | | H04B 10/1127 398/131 |
| 2012/0121271 A1 * | 5/2012 | Wood | | H04B 10/1121 398/118 |
| 2014/0093249 A1 * | 4/2014 | Roberts | | G01C 21/165 398/127 |
| 2015/0188628 A1 * | 7/2015 | Chalfant, III | | G02B 13/22 398/131 |
| 2015/0244458 A1 * | 8/2015 | Erkmen | | H04B 10/00 398/122 |
| 2015/0326313 A1 * | 11/2015 | Brouillet | | H04B 10/11 398/131 |

* cited by examiner

ACQUISITION, TRACKING, AND POINTING APPARATUS FOR FREE SPACE OPTICAL COMMUNICATIONS WITH MOVING FOCAL PLANE ARRAY

CROSS-REFERENCE TO RELATED APPLICATIONS

This application claims the benefit of U.S. provisional patent application No. 61/921,331, filed Dec. 27, 2013, for "Rapid Free Space Optical Link Acquisition with Moving Focal Plane Containing an Array of Detectors." Such application is incorporated herein by reference in its entirety.

BACKGROUND

The present invention relates to the field of optical wireless communications, and in particular to acquisition, tracking, and pointing (ATP) systems for free space optical (FSO) communications.

FSO systems employ light propagating in free space to transmit data without using a connecting cable or transmission line. An FSO system typically consists of a set of two transmitting terminals and receiving terminals or transceiver terminals. Electrical communication signals are converted to optical signals, and then transmitted from the telescope of the transmitting optical terminal. The receiving terminal receives the incoming optical signal into a receiving telescope, which focuses the signal into an optical focal plane for coupling into a photodetector, which then converts the light energy back into an electrical signal.

In order for a receiving terminal to receive an optical signal from a transmitting terminal, the terminal telescopes must be properly aligned. ATP components provide the beam steering necessary for optical telescopes in FSO systems. ATP components act to steer a transmitting telescope or receiving telescope, or both, to point in a desired direction.

Beam steering in optical systems may be accomplished by changing the refractive index of the medium through which the beam is transmitted, or by the use of mirrors or lenses. One existing beam-steering solution is motorized gimbals. A gimbal is a mechanical apparatus to allow a suspended object to rotate freely along two simultaneous axes, within a defined angle of view. A gimballing system used for the alignment of an optical transmitter or receiver typically moves the entire transmitting or receiving telescope through the required field of view. Often, the transmitter and receiver telescopes are mechanically coupled so that the transmitted beam is in the exact direction of an incoming optical beam for collection by the receiving telescope, and thus the two telescopes operate with a common gimballing system.

Gimbal-based FSO systems may be quite heavy due to the weight of the mechanical components, motors, and servos. Gimbal-based systems may also be bulky due to the required mechanical components. Finally, mechanical gimballing systems may require the use of a great deal of electrical power, far more power than is typically consumed by the electronics associated with an optical receiver or transmitter system.

As an alternative to gimbal-based FSO systems, U.S. Pat. Nos. 7,224,508, 7,612,317, 7,612,329, and 8,160,452 teach beam steering by moving an optical fiber in the x-y focal plane of the receiver telescope, including, for example, the use of micro-electro-mechanical systems (MEMS) components to position the optical fiber.

BRIEF SUMMARY

The present invention is directed to an FSO system and ATP components for an FSO system using a multi-element array of photo-detectors positioned in the focal plane of an optical transmitter, receiver, or transceiver telescope. As an optical signal is received in the telescope, that signal is detected on certain elements of the multi-element focal plane detector array. In response, the focal plane detector array may be repositioned within the focal plane of the telescope. In certain implementations, a high-speed optical detector, an optical transmitter diode, an optical fiber, or other optical communications element may be positioned at the center of the multi-element detector array. The detector array is manipulated such that the light signal input maximum is aligned with the optical communications element. In this way, the telescope may be aligned without the use of traditional "beam steering" techniques.

By noting the x-y position of the incoming signal on the telescope focal plane based on the elements of the multi-element detector array that receive that signal, the angle of a remote incoming optical signal may be detected, and that information may be used to control the movement of the optical communications element to the location of the arriving remote terminal optical signal. The invention simplifies FSO systems by eliminating the need for beam splitters and prisms that would be required if a multi-element array detector were employed as a wavefront detector and implemented remotely from the transmitter. In contrast to the present invention, this alternative approach would require two separate optical paths and relatively complex optical component design, and could require mirrors for 90-degree turns.

These and other features, objects and advantages of the disclosed subject matter will become better understood from a consideration of the following detailed description, drawings, and claims directed to the invention. This brief summary and the following detailed description and drawings are exemplary only, and are intended to provide further explanation of various implementations without limiting the scope of the invention, which is solely as set forth in the claims.

DETAILED DESCRIPTION

With reference to FIGS. 1 through 7, an implementation of the present invention may now be described. A laser communications transceiver incorporating the rapid acquisition, tracking and pointing (ATP) system is described herein, but the invention is not so limited, and in fact may be put to other applications where the ATP function is desired. The optical system of FIGS. 1 through 7 consists of beam expansion optics and focusing optical design that provides angle of arrival direction measurement and controlled motion in the focal plane that provide immediate alignment of the incoming optical beam. Additionally, for a transmitter telescope, it provides controlled motion in the focal plane that aligns precisely the outgoing transmitted beam in the direction of an incoming optical beam from a remote optical terminal.

The focal plane contains an array of photo-detectors of precise size to provide a correspondingly precise measurement of the position of a focused optical beam spot that strikes the detectors, yielding various optical signal photocurrent amplitudes in the vicinity of the beam's focused spot. Each detector array element that receives its relative part of the beam spot's energy provides positional information to the focal plane's translational system. This information from each element of the multi-element detector array is transferred to the control system, which uses the information to calculate a maximum beam spot. The controller moves the optical communications element at the center of the multi-element detector array to the maximum beam spot in the focal plane, thereby aligning the optical communications element at the maximum optical intensity location, and therefore synchronizing the FSO link.

Figure 1:
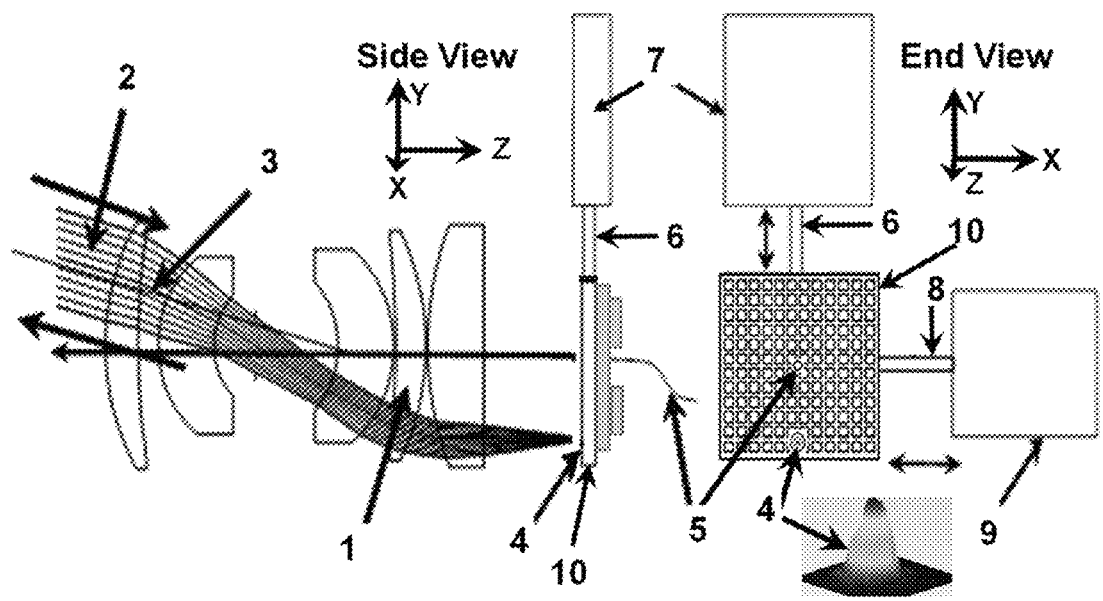
FIG. 1 illustrates a side and end view of an optical telescope with a focal plane array receiving an optical signal at an edge of the focal plane array.

FIG. 1 illustrates the operational design of an implementation of the free space optical communications transceiver telescope and focal plane components described in this invention with a high speed photo-receiver 5 as the optical communications element. A side view is shown to the left of FIG. 1, with an end view on the right. The telecentric telescope contains five optical elements 1 and its wide angle input lens shows an entering beam 2 from an angle 3 that is focused onto the focal plane at a spot 4, illuminating several of the detectors in the focal plane array (FPA) 10 in the focal plane near the bottom edge of the array. These detectors send signals to the control electronics identifying the optical spot's location, which in turn commands the movement of the focal plane assembly to align the high speed photo-receiver 5 at the center of the FPA with the exact position of the focused optical spot 4.

Figure 2:
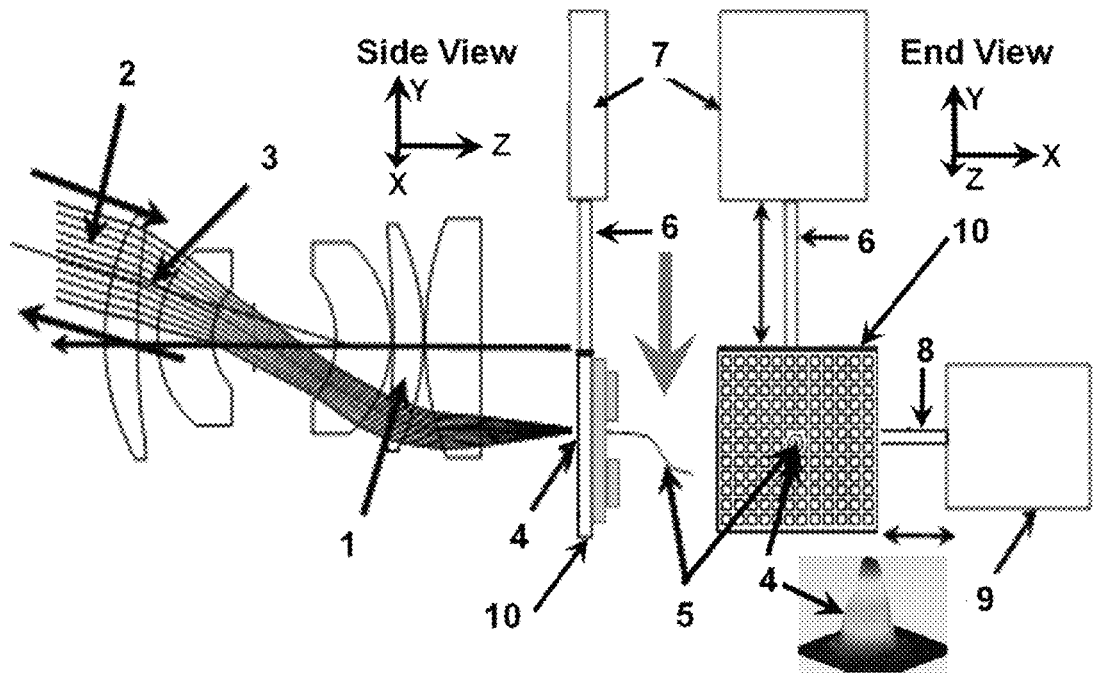
FIG. 2 illustrates a side and end view of an optical telescope with a focal plane array translated such that an optical transmission element is at the optical signal maximum.

FIG. 2 shows the FPA focal plane moved to its new position so that the high speed photo-receiver has been moved and is located at the optical beam spot location. In FIG. 2, the focal plane assembly is moved down to the position aligning the center of FPA 10, at the high speed photo-receiver 5, with the arriving optical beam spot. FPA 10 has been moved by the positioning motors 7 and 9 and actuators in the Y-direction 6 and in the X-direction 8 to align the photo-receiver 5 to exactly overlap the focused spot 4; it converts the optical signal to an electrical signal connected by wire to the motion control electronics.

The connecting wires to photo-receiver 5 can in certain implementations be replaced with an optical fiber matched for maximum optical power coupling and be used for both receiving and transmitting optical signals from remotely located electronics. This requires that a polished optical fiber flat surface for input and output be placed and aligned precisely within the focal plane at the center of the FPA 10.

In certain implementations, for use in an FSO transmitter telescope, the diode in the center of the FPA 10 is replaced by an optical emitter such as a laser diode that transmits from the center of FPA 10 and its focal plane of an identical telecentric telescope. The FPA 10 detectors in this implementation function by identifying the direction and location of a remote FSO terminal's arriving signal beam using the same technique as described above with respect to the high speed photo-detector 5. The location of the focused spot arriving from a remote FSO terminal would identify its direction of arrival via its beam spot X-Y position on the FPA 10, and command the FPA assembly to move to the X-Y position for transmission in the direction of the arriving beam from the remote FSO terminal.

Figure 3:
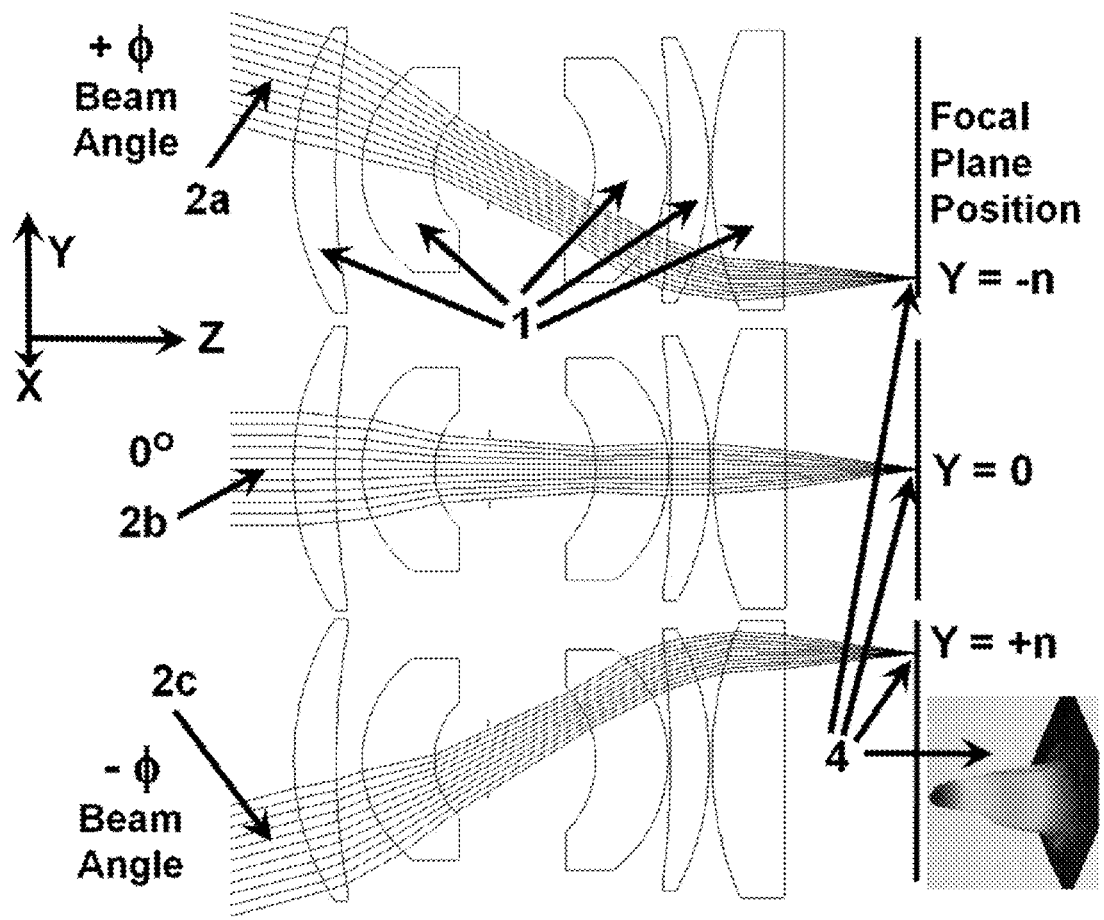
FIG. 3 illustrates three different incoming beam angles to an optical telescope and the corresponding locations where an optical signal strikes a focal plane array.

The telecentric optical design is illustrated in FIG. 3 by viewing it from the side for an example for various angles landing in the focal plane along the Y-axis. The simple five-lens system 1 converts the beam arrival angles into a corresponding optical spot in the X-Y focal plane 4. In this illustration, only the Y-axis is shown. Three different input beam angles are depicted (2a, 2b, 2c) arriving from the left and transformed to an X-Y location in the focal plane on the right side where the beam spots are focused 4. The optical design is spherical providing linearity in the X-Y plane.

Figures 4A, 4B, 4C:
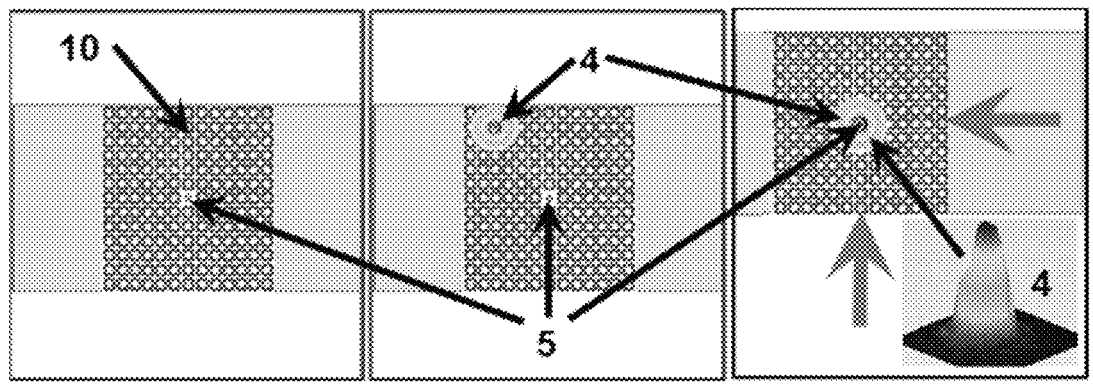
FIGS. 4a, 4b, and 4c each illustrate a front view of a focal plane array showing the location of an optical fiber, an incoming optical signal in FIG. 4b, and the position of the focal plane array after translation with respect to the optical signal in FIG. 4c.

FIG. 4 depicts an end view of the focal plane with the FPA 10 and its centered high speed photo-detector 5. The first position (4a) shows the original centered focal plane assembly position without any beam illumination; the second shows the same position with a beam spot 4 landing in the upper left corner onto the nearby FPA detectors. The center of the spot will provide a strong photocurrent to the detectors near the center of the beam, while the detectors further from the center radially will record lower photocurrents. The 3D beam spot is depicted in the lower right corner of FIG. 4 illustrating the center of the spot with the strongest optical signal and the radial reduction in optical power that is measured by the group of detectors. All of the detectors receiving light energy provide an electrical signal to the control electronics, which employs a relative location algorithm to calculate the distance and direction from the centered high speed photo-detector receiver 10 (or optical fiber).

Figure 5:
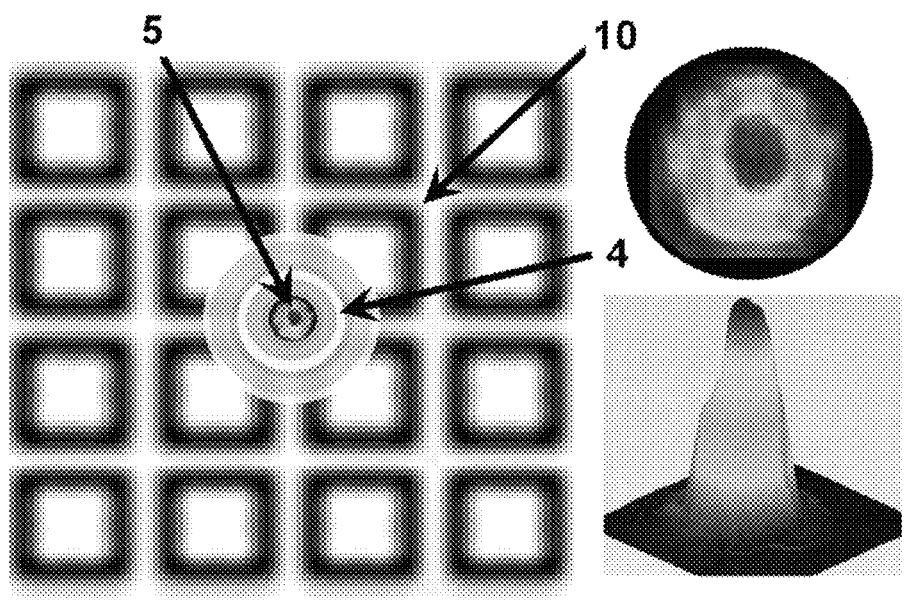
FIG. 5 shows a close-up view of an optical signal received at the focal plane array, with a three-dimensional graph of the optical signal intensity on the focal plane array in top and side perspective view.

FIG. 5 shows a close up illustration of the FPA detectors in the vicinity of the high speed photodetector 5 after having been moved to the optical beam spots position. The photographs on the right side show a beam profile measurement of an optical spot.

After the movement of the FPA assembly 10 to this receiving location, a tracking algorithm is employed that sustains the optimum alignment for the highest optical signal arriving to the photo-detector. The algorithm in certain implementations uses quad-detector centroiding. The position of the photo-receiver is actively and rapidly updated and provides tracking of remote moving FSO terminals. The adjacent four detectors are used for quad-detector signal balancing centroiding. Second-order signals from detectors that are the next neighbors to the four adjacent detectors may also be used in the algorithm. The short term average optical power received at the high speed photo-detector 5 is used in the control calculations.

For an FSO transmitter telescope with an LED or laser diode as an optical communications element, with the beam spot tracking of a beam arriving from a remote FSO terminal, the alignment with the remote terminal can use the same quad-detector signal balancing as the receiver to maintain the beam alignment with the remote FSO terminal for link synchronization.

Figure 6:
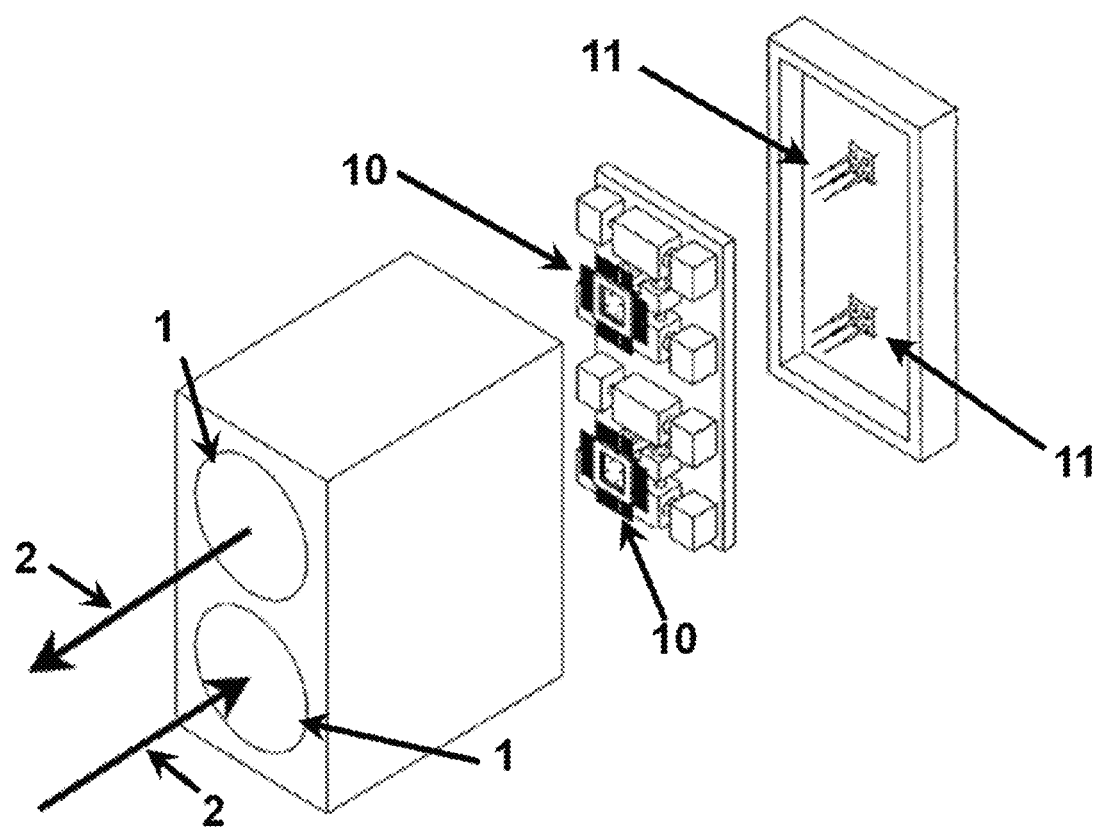
FIG. 6 illustrates an implementation with a separate receiver and transmitter telescope using a focal plane array in the focal plane of the telescope.

FIG. 6 illustrates an optical telescope system that may utilize the ATP components described above with a separate transmitter and receiver. Two sets of lenses 1 transmit beam 2 into and out of the device. Two FPA detectors 10 are used, with connecting components 11 to transmit the signals received and to be sent.

Figure 7:
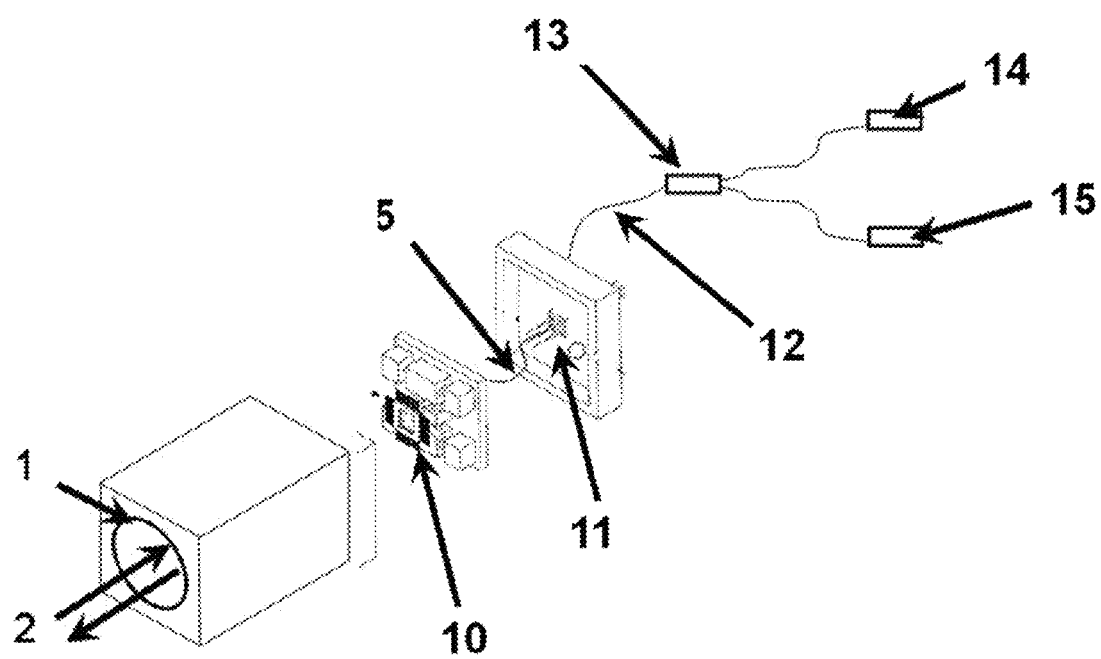
FIG. 7 illustrates an implementation with a single transceiver telescope using a focal plane array in the focal plane of the telescope.

Illustrated in FIG. 7, using an optical fiber at the location of the photo-detectors or transmitters, both transmit and receive signals can use the same centered fiber within the same telescope. This implementation requires optical isolation techniques applicable to FSO systems. A transmission optical fiber 12 is connected to a fiber optic coupler/splitter 13 to separate (and combine) the two separate optical paths from receiver 14 and transmitter 15. This system is significantly more complicated and includes more fiber optic components than the implementation of FIG. 6.

The FPA detector elements rapidly determine the incoming angle of arrival and therefore the focal plane position of the beam spot then send this information to the ATP control loop to move the receiver (or fiber) to the incoming angle of the beam. The high sensitivity detectors measure the optical strength at each of the different detectors and send this information matrix to the control algorithm that determines the spot's exact location. To first order, four of the detectors provide the largest signals and provide position (angular) information. The surrounding detectors will provide the 2nd and 3rd order accuracies that provide the most precise information on the location of the spot, thereby sending this information through the position (angular) detection signal processing and algorithms.

During an acquisition scan for a terminal to terminal FSO link, contact is made with the array at first pass in the scan. The beam spot is measured in the matrix position, and with multiple detectors illuminated, and with their respective positions known, this single pass measurement is processed and the focal plane array is moved over so that the centered device (or fiber) is aligned with the beam spot. Each element's position, and its measured optical power level, can be collectively integrated algorithmically and precisely determine the position of the illuminating spot. However, the measurement is immediate and simultaneous, so the signal to the motion control system for the focal plane translation stages is immediate, thereby providing an automatic alignment at high speed.

The pattern of signals incident upon the elements that make up multi-element FPA 10 may be represented as a two-dimensional array. The array provides the location on the focal plane where the most optical power is incident. The coordinates of this location can be represented in a 2-dimensional vector R.

The FPA component is movable about the defined XY-plane, with the defined origin being at the center of the optical fiber or diode (0, 0). The optical power measurements seen by the detectors in the vicinity of the focused optical spot are stored in an n×n matrix, which we will call P, with each array element represented as $P_{ij}$. For the "missing" elements, that is, those elements in P that correspond to locations where the fiber is, the value is stored as (0, 0).

To find the horizontal component of R, we create a vector, Ph, of the values of the sums of the sensor values in each column of P.

$$Ph_j = \sum_{i=1}^{n} P_{ij}$$

Ph' is created from Ph by the following normalization process.

$$Ph'_j = \begin{cases} Ph_j / \sum_{j=1}^{n} Ph_j, \text{ when } \sum_{j=1}^{n} Ph_j \neq 0 \\ Ph_j, \text{ when } \sum_{j=1}^{n} Ph_j = 0 \end{cases}$$

The vertical coordinate of each row of the sensor array is stored in a vector $d_{row}$. The dot product of Ph' and $d_{row}$ yields the horizontal component of R, which we denote as $R_x$.

$$R_x = Ph' \cdot d_{row}.$$

The vertical component is found in an analogous manner. We create a vector, Pv, of the values of the sums of the sensor values in each row of P.

$$Pv_i = \sum_{j=1}^{n} P_{ij}$$

Pv' is created from Pv by the following normalization process.

$$Pv'_i = \begin{cases} Pv_i / \sum_{i=1}^{n} Pv_i, \text{ when } \sum_{i=1}^{n} Pv_i \neq 0 \\ Pv_i, \text{ when } \sum_{i=1}^{n} Pv_i = 0 \end{cases}$$

The horizontal coordinate of each column of the sensor array is stored in a vector $d_{col}$. The dot product of Ph' and $d_{col}$ yields the vertical component of R, which we denote as $R_y$.

$$R_y = Pv' \cdot d_{col}$$

We now have the vector, R, which points to the location, relative to the FPA center with the optical fiber, transmitter diode, or receiver diode, where the peak optical power is found.

$$R = [Rx, Ry]$$

The control system of the free space optical communications system is then commanded to move to the location indicated by R, which places the peak of the optical power in the center of the FPA 10.

Since the above method allows for the detection of the peak power location any time observable optical power is seen anywhere on the sensor array, the acquisition process becomes simple. One or both terminals begin a search by moving the stage in a scanning pattern. Both terminals monitor their sensor arrays, and, if at any time any of the sensors report a value greater than a minimum threshold power level, the peak power location is determined by the previously explained method. The terminal then translates the fiber (or active transmitter or receiver) to the location indicated by the vector R. At this point, the beam is pointed directly at the other terminal. Since it is pointed directly at the other terminal, it will be seen by that terminal's sensor array, and it will move its fiber (or diode) to the location of the peak optical power. At this point, both terminals are aimed at each other, and the acquisition process is complete. Having acquired the location of the other terminal, each terminal tracks the other by utilizing quad-detector centroiding algorithms and by monitoring the power received into the optical fiber or by the high speed detector diode.

It may be understood that this simplified, single-step alignment of certain implementations of the present invention does not require the conventional internal "beam steering" techniques of many optical telescope systems; instead, it moves the communications detector to the location of the beam spot, thereby requiring smaller mass movement and high precision. Additionally, the high-speed photo detector at the center of the focal plane array can, in certain implementations, be an optical fiber that precisely matches the optical design of the telescope for maximum optical power coupling efficiency; this optical fiber is connected to the receiver and/or the optical transmitter devices remotely inside the electronics systems of the FSO device.

The present invention in various implementations may be used for purposes such as beam stabilization during FSO communications. The fast-moving actuators that control position of the focal plane array and optical communications element may compensate for vehicle movements and vibrations when the associated optical telescope is mounted on a vehicle. In one implementation, accelerometers send the frequencies and directions of the vibrations of the vehicle to the focal plane array motion controller. In this way, the response and compensation to vibration is controlled directly in the X-Y plane of the focal plane array.

The present invention has been described with reference to the foregoing specific implementations. These implementations are intended to be exemplary only, and not limiting to the full scope of the present invention. Many variations and modifications are possible in view of the above teachings. The invention is limited only as set forth in the appended claims. All references cited herein are hereby incorporated by reference to the extent not inconsistent with the disclosure herein. Unless explicitly stated otherwise, flows depicted herein do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims. Any disclosure of a range is intended to include a disclosure of all ranges within that range and all individual values within that range.

The invention claimed is:

1. An acquisition, tracking, and pointing apparatus for free space optical communications, comprising:
   a. an optical telescope comprising a plurality of telescope lenses positioned to receive and focus a free space optical communications signal;
   b. a detector array comprising a plurality of square-shaped detector elements arranged in a grid at a focal plane of the optical telescope, wherein each detector element is configured to transmit an electrical signal proportional to the strength of the free space optical communications signal striking such detector element;
   c. an optical emitter positioned within the focal plane of the optical telescope and adjacent to at least a subset of the plurality of detector elements in the detector array; and
   d. a plurality of actuators attached to the detector array to translate the detector array and optical emitter within the focal plane of the optical telescope such that the optical emitter is translated to the position of the detector elements transmitting stronger electrical signals while remaining in the focal plane of the optical telescope.

2. The apparatus of claim 1, wherein the optical emitter is an optical emitter diode.

3. The apparatus of claim 1, wherein the optical emitter is an optical fiber.

4. The apparatus of claim 1, wherein a first actuator of the plurality of actuators is positioned to move the detector array in a first direction within the focal plane of the optical telescope, and a second actuator of the plurality of actuators is positioned to move the detector array in a second direction within the focal plane of the optical telescope, wherein the first direction is perpendicular to the second direction.

5. The apparatus of claim 1, wherein the detector array comprises an outer edge and wherein a light signal received through the optical telescope falls onto the detector array within the outer edge.

6. The apparatus of claim 1, wherein the subset of detector elements comprise a plurality of detector elements adjacent to the optical emitter.

7. The apparatus of claim 6, wherein the optical emitter is positioned at a geometrical center of the detector array.

8. The apparatus of claim 1, further comprising a controller comprising an input and an output, wherein the detector array comprises a signal output comprising relative location data of an arriving focused beam optical spot, wherein the controller input is connected to the detector array signal output, and wherein the controller output is in communication with the actuator to control movement of the actuator.

9. The apparatus of claim 8, wherein the detector array signal output comprises a plurality of element signal outputs, each output from a detector element in the detector array.

10. The apparatus of claim 9, wherein the controller is configured to receive the plurality of element signal outputs, calculate an x-y translation for the detector array, and output the controller output to the actuator proportional to the calculated x-y translation.

11. The apparatus of claim 10, wherein the controller is configured to calculate the x-y translation based on a centroid of the plurality of element signal outputs.

12. The apparatus of claim 11, wherein the controller is configured to calculate the x-y translation based on a centroiding of data from the subset of the plurality of detector elements receiving a focused optical beam spot.

13. An optical telescope, comprising:
a. a plurality of telescope lenses for both receiving and transmitting a free space optical signal and creating from the signal a focused beam spot on a focal plane of the plurality of telescope lenses;
b. a detector array comprising a plurality of square-shaped detector elements arranged in a grid in the focal plane of the plurality of telescope lenses;
c. an optical emitter positioned within the focal plane of the set of telescope lenses and adjacent to at least a subset of the plurality of detector elements in the detector array;
d. a first actuator attached to the detector array to translate the detector array and optical emitter within the focal plane of the optical telescope in a first direction;
e. a second actuator attached to the detector array to translate the detector array and optical emitter within the focal plane of the optical telescope in a second direction perpendicular to the first direction;
f. a first motor attached to the first actuator;
g. a second motor attached to the second actuator; and
h. a controller in communication with the first motor to actuate the first motor and in communication with the second motor to actuate the second actuator, and further in communication with the detector array to receive a signal from at least a subset of the plurality of detector elements of the detector array in order to center the optical emitter at a beam spot optical intensity maximum from the set of telescope lenses and within the focal plane of the plurality of telescope lenses.

14. The optical telescope of claim 13, wherein the optical emitter is centered in the plurality of detector elements of the detector array.

15. The optical telescope of claim 14, wherein a set of first-order adjacent set of the plurality of detector elements are directly adjacent to the optical emitter, and wherein a second-order adjacent set of the plurality of detector elements are directly adjacent to the first-order adjacent set of the plurality of detector elements.

16. The apparatus of claim 13, wherein the optical emitter is an optical emitter diode or an optical fiber.

17. The optical telescope of claim 13, wherein a detector element from the plurality of detector elements is centered at an optical beam spot incoming from the plurality of telescope lenses.

* * * * *